US007788482B2

United States Patent
Irwin, Jr.

(10) Patent No.: US 7,788,482 B2
(45) Date of Patent: *Aug. 31, 2010

(54) SYSTEM AND METHOD FOR SECURING ON-LINE DOCUMENTS USING AUTHENTICATION CODES

(75) Inventor: Kenneth E. Irwin, Jr., Dawsonville, GA (US)

(73) Assignee: Scientific Games International, Inc., Newark, DE (US)

( * ) Notice: Subject to any disclaimer, the term of this patent is extended or adjusted under 35 U.S.C. 154(b) by 141 days.

This patent is subject to a terminal disclaimer.

(21) Appl. No.: 11/039,748

(22) Filed: Jan. 19, 2005

(65) Prior Publication Data

US 2005/0262338 A1   Nov. 24, 2005

Related U.S. Application Data

(60) Provisional application No. 60/568,773, filed on May 6, 2004.

(51) Int. Cl.
    *H04L 9/00*   (2006.01)
(52) U.S. Cl. ...................... 713/155; 713/176
(58) Field of Classification Search .................. 726/6; 713/176, 155, 156; 380/51, 281, 282, 44, 380/45; 643/17
    See application file for complete search history.

(56) References Cited

U.S. PATENT DOCUMENTS

| 4,633,036 | A | * | 12/1986 | Hellman et al. ............... 380/30 |
| 4,842,278 | A | | 6/1989 | Markowicz |
| 4,922,522 | A | | 5/1990 | Scanlon |
| 5,119,295 | A | | 6/1992 | Kapur |
| 5,420,406 | A | | 5/1995 | Izawa et al. |
| 5,615,268 | A | * | 3/1997 | Bisbee et al. ............... 713/176 |
| 5,667,250 | A | | 9/1997 | Behm et al. |
| 5,694,471 | A | * | 12/1997 | Chen et al. ..................... 705/76 |
| 5,769,458 | A | | 6/1998 | Carides et al. |
| 5,791,990 | A | | 8/1998 | Schroeder et al. |
| 5,863,075 | A | | 1/1999 | Rich et al. |
| 5,995,626 | A | * | 11/1999 | Nishioka et al. ............. 705/76 |
| 6,107,913 | A | | 8/2000 | Gatto et al. |
| 6,110,044 | A | * | 8/2000 | Stern ............................ 463/29 |
| 6,170,744 | B1 | * | 1/2001 | Lee et al. ..................... 235/380 |
| 6,322,446 | B1 | * | 11/2001 | Yacenda ....................... 463/16 |

(Continued)

FOREIGN PATENT DOCUMENTS

JP    2005 071245    3/2005

OTHER PUBLICATIONS

Lottery Cheaters Tool-Kit by Charles Cooper 2004, pp. 1-43.*

*Primary Examiner*—Eleni A Shiferaw
(74) *Attorney, Agent, or Firm*—Dority & Manning, P.A.

(57) ABSTRACT

A system method for providing an authentication code across a network for use in authentication of documents, such as printed lottery tickets. The system includes document-printing terminals that create a first key and a second key, with the first key used to generate an authentication code for printing on the document, and the second key is sent to a central server and usable to verify that the first key created the authentication code. The central server can also provide ticket serial numbers for tickets being dispensed at the terminals and the first key can be combined with the serial number and other secondary data to create the authentication code.

6 Claims, 4 Drawing Sheets

U.S. PATENT DOCUMENTS

| | | | |
|---|---|---|---|
| 6,402,614 B1 * | 6/2002 | Schneier et al. | 463/17 |
| 6,552,290 B1 | 4/2003 | Lawandy | |
| 6,557,759 B1 * | 5/2003 | Zolotarev et al. | 235/380 |
| 6,685,562 B1 * | 2/2004 | Rantanen | 463/17 |
| 6,875,105 B1 | 4/2005 | Behm et al. | |
| 6,899,621 B2 | 5/2005 | Behm et al. | |
| 6,918,038 B1 * | 7/2005 | Smith et al. | 726/22 |
| 2001/0011350 A1 * | 8/2001 | Zabetian | 713/176 |
| 2001/0018360 A1 * | 8/2001 | Nulph | 463/16 |
| 2001/0034716 A1 * | 10/2001 | Goodwin | 705/60 |
| 2002/0067827 A1 * | 6/2002 | Kargman | 380/54 |
| 2002/0084327 A1 | 7/2002 | Ehrhart et al. | |
| 2002/0119817 A1 * | 8/2002 | Behm et al. | 463/17 |
| 2002/0188845 A1 * | 12/2002 | Henderson et al. | 713/168 |
| 2003/0074327 A1 * | 4/2003 | Meadow et al. | 705/75 |
| 2004/0053011 A1 * | 3/2004 | Behm et al. | 428/195 |
| 2004/0054623 A1 * | 3/2004 | Collins et al. | 705/39 |
| 2004/0054678 A1 * | 3/2004 | Okamoto et al. | 707/100 |
| 2004/0056416 A1 * | 3/2004 | Bennett, III | 273/269 |
| 2004/0076310 A1 | 4/2004 | Hersch et al. | |
| 2004/0109567 A1 * | 6/2004 | Yang et al. | 380/277 |
| 2004/0127279 A1 | 7/2004 | Gatto et al. | |
| 2004/0128395 A1 * | 7/2004 | Miyazaki | 709/229 |
| 2005/0003884 A1 * | 1/2005 | Meyer et al. | 463/17 |
| 2005/0133584 A1 * | 6/2005 | Finnerty et al. | 235/375 |
| 2005/0163549 A1 * | 7/2005 | Shima et al. | 400/62 |

* cited by examiner

SYSTEM AND METHOD FOR SECURING ON-LINE DOCUMENTS USING AUTHENTICATION CODES

CROSS-REFERENCE TO RELATED APPLICATION

This application claims the benefit of U.S. Provisional Patent Application Ser. No. 60/568,773, filed May 06, 2004, the entirety of which is hereby incorporated herein by this reference.

BACKGROUND OF THE INVENTION

1. Field of the Invention

The present invention generally relates to methods of document verification. More particularly, the present invention relates to a system and method of providing authentication codes over a network to embed in or print on documents for verification and authentication purposes.

2. Description of the Related Art

There are several methods known to embed security measures into a document to help prove that the document is authentic. The most basic methods are to impose or emboss a visible seal on the document. It is also known to use a watermark or a ribbon in the substrate of the document, or use color shifting ink, all of which are readily visible to a person viewing the document. There are other methods to maintain document authenticity which are not readily visible to a viewer, such as microprinting, or the use of heat or light sensitive ink.

One particularly important area for document authentication concerns lottery tickets. In most instances, mere possession of a winning lottery ticket entitles the holder to the winnings. Thus, authentication of the presented lottery ticket is critically important. For example, lottery on-line tickets which are common in many countries and states are, by necessity, printed and presented to the purchaser in real-time with transactional data printed on the lottery ticket via a thermal or impact printer. To enhance security, lotteries typically use preprinted ticket stock with serial numbering on the back of the printing substrate as well as fluorescent and other inks on the ticket substrate to help prove authenticity and integrity. The preprinted serial numbering provides much of the security in determining the authenticity of a winning ticket because the distribution of the preprinted serial number ticket stock is maintained by an entity separate from the one controlling the printing of transactional data. When a winning ticket is presented for redemption, an audit trail can be established between the ticket stock serial number and the transactional data.

However, this added paper stock security has the disadvantage of high cost, as well as the logistics of tracking the ticket stock. Also, the labor intensive nature of correlating the ticket stock to an on-line lottery ticket printed at a given retailer at a given time typically prohibits the method's use for all but high-tier winning tickets. Finally, it may be possible for an insider with access to the system controlling the printing of transactional data to simply purchase a Lottery ticket from a retailer shortly after it was determined that that a high tier winner was sold at that location to thereby gain illicit knowledge of the appropriate ticket stock serial number range.

A second tier of defense can be added to on-line ticket security through either encrypting the ticket-provider transactional database or the printed ticket serial numbers. This encryption stops readily discernable correlation between the ticket provider database, which contains the listing of winning tickets, and the actual on-line ticket serial numbers printed in the field. Such action prevents an insider with access to the winning database from being able to counterfeit winning ticket serial numbers. Further, the encryption technique has the advantage of securing both high and low tier redemptions as opposed to logistical limitations limiting ticket stock serial number validation to high tier fraud. However, the method of on-line serial number encryption relies upon the encryption keys being unknown to insiders. Also, on-line serial number encryption creates a processing burden on all sales transactions at the ticket-provider and has the possibility of locking-out all legitimate redemptions if the secret encryption/decryption key(s) become lost.

Accordingly, it would be advantageous to provide a method to allow verification for remotely printed documents that does not rely upon preprinted substrate. Further, especially regarding on-line lottery tickets, such method should allow the verification and authentication of all printed documents with minimal cost in doing so. It is thus to a novel system and method for providing authentication codes across a network for use on documents that the present invention is primarily directed.

SUMMARY OF THE INVENTION

The present invention is a system and method for providing an authentication code across a network for use in authentication of documents, such as on-line printed lottery tickets. The use of an authentication code printed on the lottery tickets protects against both counterfeiting and insider attacks. In one embodiment, the invention is a system for providing an authentication code across a network for use in a document, including one or more terminals that each include a document printing device, and each terminal creates a first key and a second key wherein the first key is used to create an authentication code (typically encrypted) and the second key is usable to verify that the first key created an authentication code. Each terminal selectively uses the first key to print an authentication code on a document and sends the second key to another computer device on the network. The system includes at least one server that is in communication with the network and which receives and stores one or more second keys sent from the one or more terminals which can be used to authenticate the document from decryption of the authentication code.

In another embodiment, the invention is a method of providing an authentication code across a network for use in the verification of a document including the steps of generating a first key and a second key at a terminal that includes a document printing device, then transmitting the second key from the terminal to a server on the network, storing the second key at the server, creating an authentication code at the terminal based upon the first key, and printing the authentication code on a document. This method can include the step of retrieving a stored second key and using it to decrypt an authentication code to authenticate a document.

In another embodiment, the invention is a method of providing an authentication code across a network for use in the verification of a document including the steps of generating a first key and a second key at a terminal that includes a document printing device, then encrypting the second key with the terminal's permanently assigned private key (not the first key described above) to create a certificate, then transmitting the certificate from the terminal to a server on the network, storing the certificate at the server, creating an authentication code at the terminal based upon the first key, and printing the authentication code on a document. This method can include the step of retrieving the stored certificate and the terminal's permanently assigned public key to derive the second key and then use it to decrypt an authentication code to authenticate a document.

In yet another embodiment, the invention is a method of providing an authentication code across a network for use in the verification of a document including the steps of generating a first key and a second key at a terminal that includes a document printing device, then transmitting the second key from the terminal to a server on the network, storing the second key at the server, creating an authentication code at the terminal based upon the first key, and printing the authentication code on a document. This method can include the step of retrieving a stored second key and using it to verify (i.e., cryptographically verify the digital signature as opposed to decryption) an authentication code to authenticate a document.

The present invention accordingly provides an advantage as it allows verification for remotely printed documents, such as lottery tickets, without the use of preprinted substrate. The process can be done electronically to minimize the cost such that any document can be economically authenticated. In fact, in particular regard to on-line lottery tickets, the present invention can mitigate the need for preprinted serial number paper stock and encryption of the ticket-provider generated on-line ticket serial numbers as the authentication codes and usage of key-based encryption is more secure than those methods.

Other objects, advantages and features of the present invention will become apparent after review of the hereinafter set forth Brief Description of the Drawings, Detailed Description of the Invention, and the Claims.

DETAILED DESCRIPTION OF THE INVENTION

Figure 1:
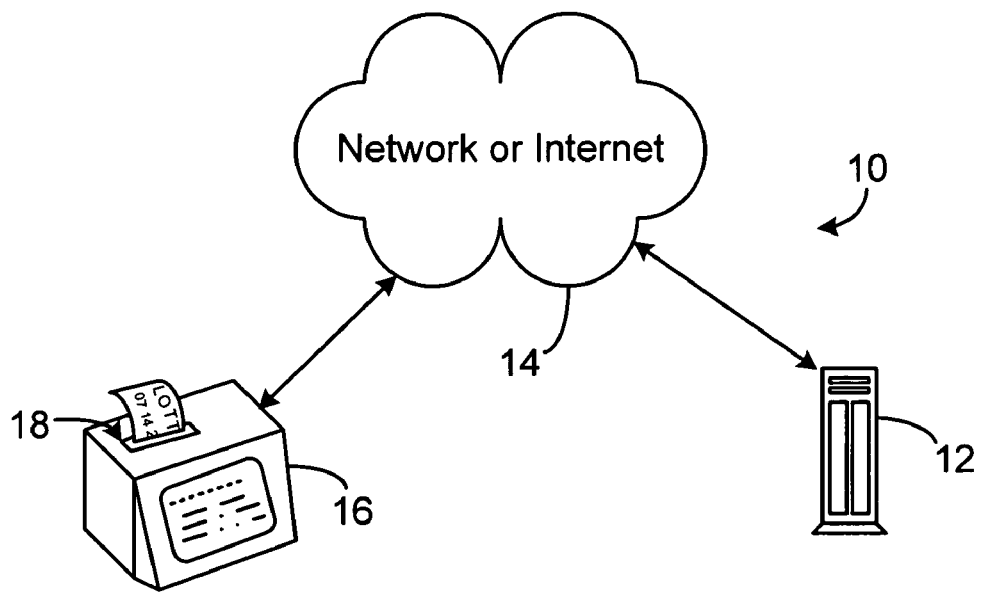
FIG. 1 is a diagram of the system of providing authentication codes to printed on-line lottery tickets with a key to the authentication code being transmitted to a server across a network.
Figure 2A:
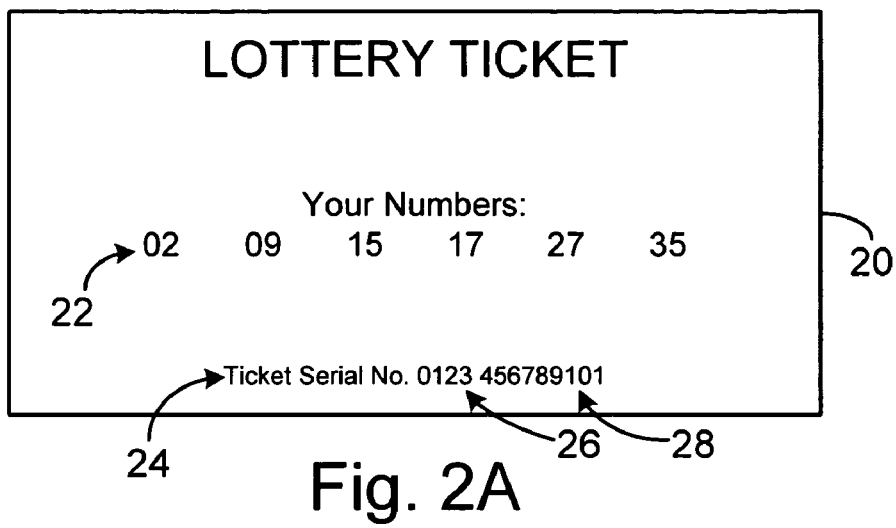
FIG. 2A is a printed on-line lottery ticket illustrating a standard serial number as provided by the central lottery site.
Figure 2B:
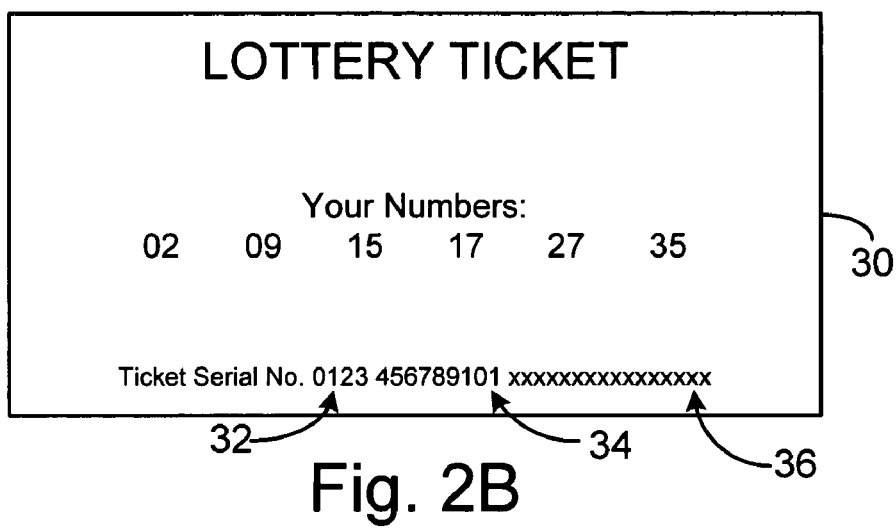
FIG. 2B is a printed on-line lottery ticket similar to FIG. 1A, with the printed serial number including an authentication code portion.
Figure 2C:
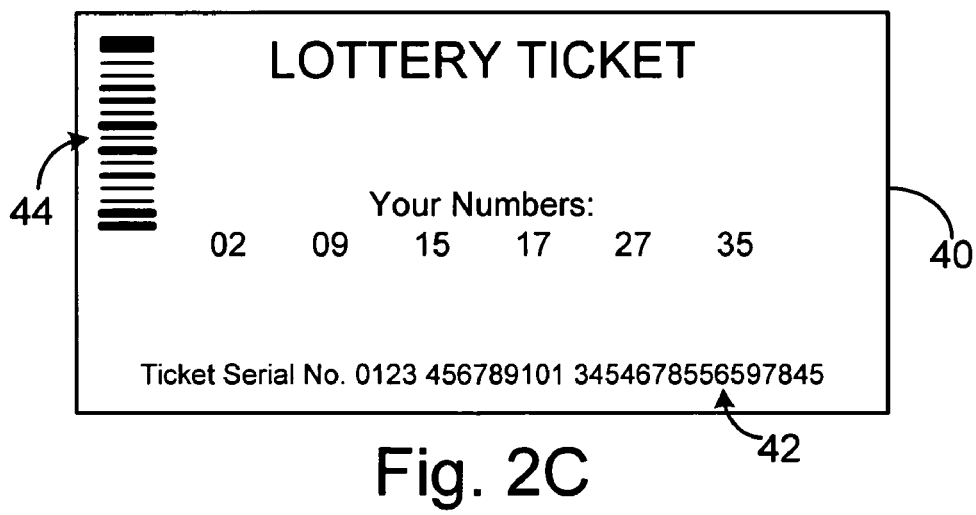
FIG. 2C is a printed on-line lottery ticket similar to FIG. 1B, with the authentication code being a numeric code.

With reference to the drawings in which like numerals represent like elements throughout, FIG. 1 is a diagram of the system 10 for providing an authentication code across a network 14 for use in a document, such as an on-line lottery ticket (FIGS. 2A-2C). One or more ticket-dispensing terminals 16 that each include a document printing device 18. Examples of such ticket-dispensing terminals include the Extrema sold by Scientific Games Inc., the T-2000 sold by Sagem, and the Altura sold by GTECH, Inc. The one or more terminals 16 communication with a server 12 across the network 14, and the server 12, in this embodiment, issues ticket serial numbers to the one or more terminals 16 when necessary and receives and stores one or more second keys transmitted from the one or more terminals 16 as is further described herein.

To provide document security to the printed tickets, the terminal generates and appends an authentication code to the standard ticket date and serial number at the time of ticket printing. The present invention is an alternative to the traditional methods of securing documents, such as on-line lottery tickets, as those shown in FIGS. 2A-2C. FIG. 2A is a printed on-line lottery ticket 20 with the game indicia 22 (typically a series of numbers chosen by the lottery player) and a standard serial number 24 as provided by the central lottery site (here server 12). FIG. 2B is a printed on-line lottery ticket 30 similar to FIG. 2A, with the printed serial number comprised of a four digit date 32, and 10 digit serial number 34 issued from the ticket-provider, and a 16 digit authentication code portion 36. (Careful here, since the authentication code would be at least 400 bits to be secure, the numeric authentication code could be 120 characters long).

FIG. 2C is a printed on-line lottery ticket similar to FIG. 1B, with the authentication code 32 being a numeric code. The numeric code was generated through simple multiplication of the date 32, serial number 24 and a first generated key. In this embodiment, the appended authentication code is a digital signature of the standard date and serial number and is only printed on the ticket and not transmitted to the server 12 at the time of purchase. The authentication code is generated by encrypting the standard clear text serial number with an asymmetrical (i.e., Public/Private) encryption algorithm, such as RSA, which creates a first "private" key and a second "public" key. The keys are typically based upon very large prime numbers. The key pair for the asymmetrical encryption algorithm can be generated pseudorandomly by the terminal 16, such as periodically (e.g., daily) or once at the time of dispensing the lottery ticket.

In another embodiment, depending on the particular public-key encryption algorithm in use, the lottery authority may only be able to "verify" a signature for a particular lottery terminal 16. In other words, the verifier must have all the clear-text information included in an original digital signature on the printed ticket 20 and use that information to verify the authentication on the ticket 20. The methods for verification of a Digital Signature Algorithm (DSA) signature based upon the signer's public key is well known in the art. In one embodiment, the terminal 16 would hash (mathematical summary) some data of the ticket 20, such as the date 32 and serial number 34. Then the first (private) key is used to encrypt the hash and the encrypted hash becomes a digital signature of the ticket 20. At the other end to authenticate the digital signature, the server 12 receives the authentication code and uses the terminal's 16 second (public) key to decrypt the message hash or summary. If the hashes match, the received authentication code is valid.

While the system 10 is shown as particularly securing a lottery ticket, other documents, such as currency, bonds, instruments, and other printed or remote media can use the present inventive system for security. Furthermore, the authentication code can also be stored in another data format, such as bar code 44, or other one and two dimensional data media.

Once the key pair is generated, the terminal 16 transmits the second (public) key to the server 12 while retaining its first (private) key in its own memory. The server 12 can then maintain a record of the second keys or all terminals to be used as a lookup table when a lottery ticket is validated. As is further described in the process of FIG. 6, when a winning lottery ticket was presented by a terminal 16 for validation, preferably both the date 32, serial number 34, and authentication code 36 are transmitted to the server 12, and the server 12 looks up the terminal 16 that generated the lottery ticket and the second key associated with that terminal 16. The server 12 then uses the second key to decrypt the authentication code 42 and verify that the resulting number is identical to the date and serial number 34. If the numbers are identical, the lottery ticket is authentic and was printed at the correct retailer at the correct time. Conversely, if the decrypted authentication code 42 is different than the serial number 34, the lottery ticket is possibly a forgery and the player should be made to go through other methods to receive payment. Alternately, the verification of a document can include the step of retrieving a stored second key and using it to cryptographically verify the authentication code to authenticate a document, and not decrypt the authentication code.

One advantage of utilizing the authentication code to secure the lottery ticket 20, is that the system 10 can be made secure against insider forgeries while still allowing the serial number 18 to remain as clear text at both the ticket-provider and on the printed lottery ticket 20. This is opposed to a ticket-provider based encryption or keyed-hash scheme which requires that the key be kept secret from all insiders for the system 10 to remain secure. Additionally if the ticket-provider key is lost due to a catastrophic system failure, the ticket-provider would be unable to confirm any winning lottery tickets.

While the system 10 does require a key to be kept secret to remain secure, the security is derived from the private encryption key being stored in the terminals 16 with each terminal 16 having a different first (private) key. Through distributing primary key storage over the entire terminal population, an insider attacker would have to gain access to the Central Site database and the applicable retailer terminals in the field, while at the same time overcoming whatever additional security countermeasures were built into the terminal 16 for key storage. This effectively makes the attack uneconomically feasible for illicit cashing of mid or low-tier unredeemed prizes. Furthermore, if new terminal key pairs are generated periodically (say daily) with the extant private key being deleted, the system 10 would be secured against high tier forgeries since the private key that was used to generated the authentication code 28 would be erased by the time someone attempted an illicit high tier validation. Additionally, by maintaining a record of the terminals' public keys that have been transmitted to the server it is possible for a third party to audit the public key file to ensure pseudorandom terminal key pair selection, thereby eliminating the need to trust the terminal.

Figure 3:
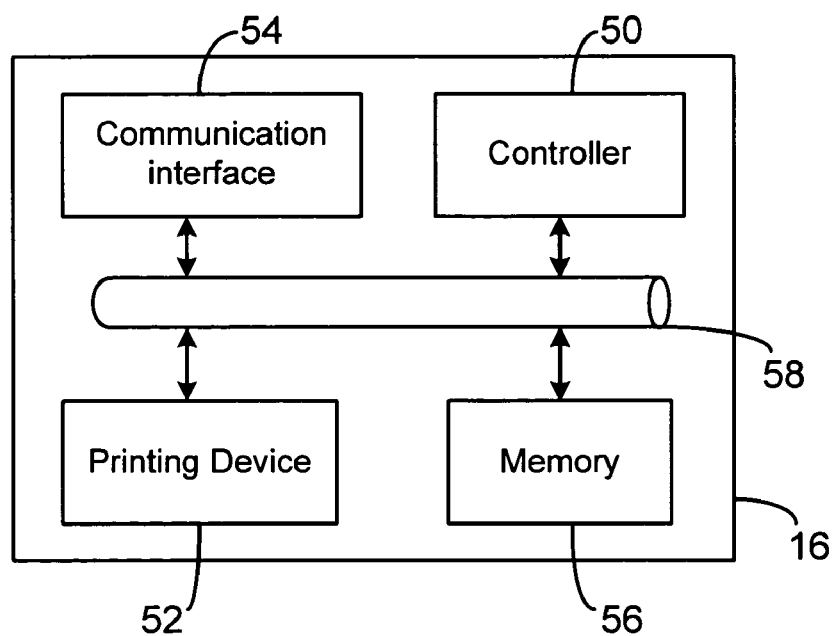
FIG. 3 is a block diagram of one embodiment of a computer platform of the on-line lottery ticket vending terminal.

FIG. 3 is a block diagram of one embodiment of a computer platform of the on-line lottery ticket vending terminal 16. The computer platform includes a document printing device 52 that controls the appropriate printing mechanism to print the on-line lottery ticket 20. A communication interface 54 is also present with a network 14; and a controller 50 and a memory 56 that all communicate via a bus 58. In this embodiment, the controller 50 generates the first key and second key wherein the first key is used to create the authentication code 36 and the second key is usable to verify that the first key created an authentication code. The first key is stored at the terminal 16, preferably in memory 56, and the controller 50 further selectively transmits the second key on the network 14 to the server 12. The controller 50 also can request the ticket serial number to print a lottery ticket, if so embodied, and creates the authentication code from the first key and causes the document printing device 52 to print the authentication code on the lottery ticket 20.

Figure 4:
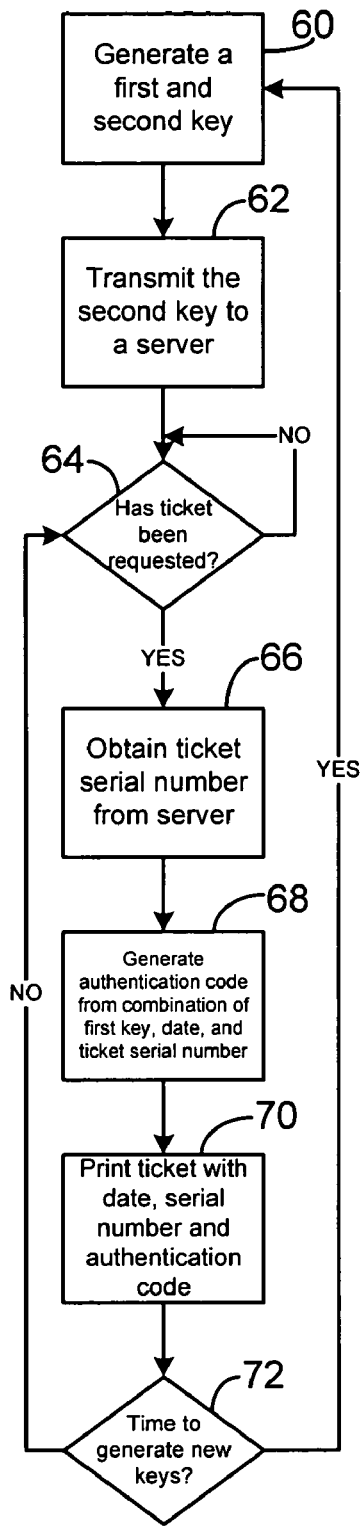
FIG. 4 is a flowchart of one embodiment of a process executing on the on-line lottery ticket vending terminal generating a first and second key to create an authentication code, print the code on a lottery ticket, and transmit the second key to the server.

FIG. 4 is a flowchart of one embodiment of a process executing on the on-line lottery ticket vending terminal 16. A first and second key are generated, as shown at step 60, and the second key is then transmitted to the server 12, as shown at step 62. One example of key generation is to select large prime numbers A and B and form N=AB. Then select an integer E>1 such that GCD(E,(A−1)(B−1))=1. Then solve the congruence, ED° 1 (mod(A−1),(B−1)) for an integer D where 1<D<(A−1)(B−1). The public encryption key is (E,N) and the private encryption key is (D,N).

A decision is then made as to whether a lottery ticket has been requested for vending from the terminal 16, as shown at decision 64. If a lottery ticket has not been requested to be vended at decision 64, then the process enters a wait state at decision 64 until a lottery ticket is requested vended. If a lottery ticket has been requested to be vended at decision 64, then the terminal 16 obtains a serial number from the 12, as shown at step 66, and then generated an authentication code 42 from the combination of the first key, date 32 and serial number 34. Then the lottery ticket 40 is printed with the date 32, serial number 34, and authentication code 42. A decision is then made as to whether it is time to generate new first and second keys, as shown at decision 72. If it is time to generate new keys, then the process returns to step 60 to again generate a first and second key. If new keys are not required at decision 72, then the process returns to decision 64 to determine if a lottery ticket is requested to be vended.

Figure 5:
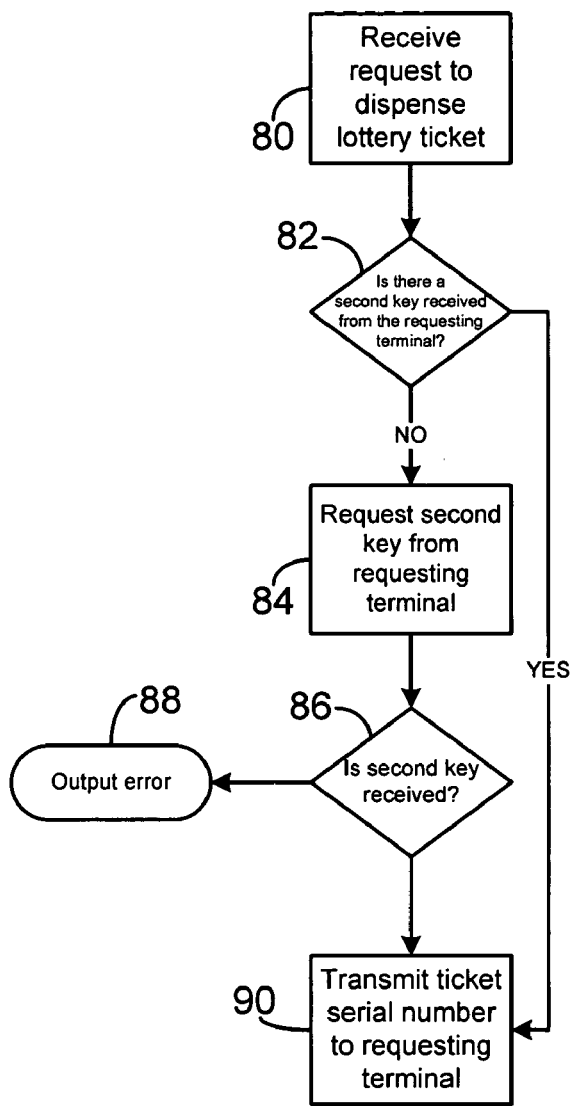
FIG. 5 is a flowchart of one embodiment of a process executing on the ticket-provider server for transmitting a ticket serial number to a terminal requesting to dispense an on-line lottery ticket.

FIG. 5 is a flowchart of one embodiment of a process executing on the ticket-provider server 12. The server 12 receives a request to dispense a lottery ticket from a terminal 16, as shown at step 80, and then a decision is made as to whether there is a valid second key received from the requesting terminal 16, as shown at decision 82. This process ensures that if the terminal 16 creates an authentication code on the lottery ticket, the requisite second key for decryption will be possessed by the lottery authority. If a second key has been received at decision 82, then the process transmits the requested serial number to the requesting terminal 16, as shown at step 90. It should be noted that the second key could have been sent to the server 12 at any time in the past, and as recently as accompanying the lottery ticket dispense request.

Otherwise, if a second key has not been received from the requesting terminal at decision 82, the second key is requested from the terminal 16 as shown at step 84, and then a determination is made as to whether the second key has been received from the requesting terminal, as shown at decision 86. If the second key has not been received (likely within a predetermined period of time) then the process outputs and error in issuing a lottery ticket serial number, as shown by error 88. Otherwise, if the second key is received at decision 86, then the ticket serial number is transmitted to the requesting lottery terminal 16, as shown at step 90, and the lottery ticket serial number issuing process ends.

Figure 6:
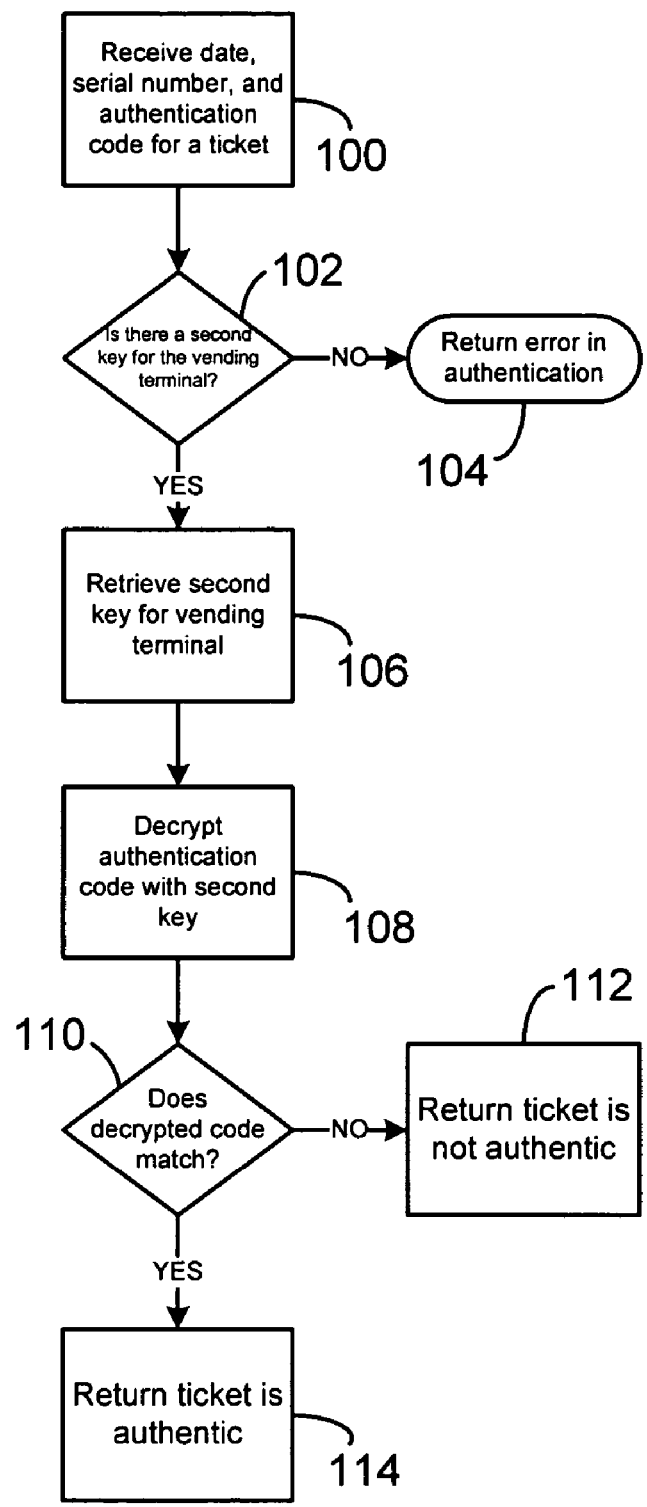
FIG. 6 is a flowchart of one embodiment of a process executing on the ticket-provider server to authenticate a ticket by receiving its authentication code and decrypting the code with the second key.

FIG. 6 is a flowchart of one embodiment of a process executing on the ticket-provider server 12 to authenticate received lottery ticket data. An authentication code 42, serial number 34 and date 32 for a lottery ticket 20 are received at the server 12, as shown at step 100, and then a determination is made as to whether there is a second key for the vending terminal 16 of the lottery ticket stored at, or accessible to the server 12, as shown at decision 102. If there is no second key stored at or accessible to the server 12 at decision 102, then an error is output for the lottery ticket authentication process, as shown at error 104.

Otherwise, if there is a stored second key for the lottery terminal 16 vended the lottery ticket at decision 102, the second key for that particular lottery terminal 16 is then retrieved by the server 12, as shown at step 106. Then the authentication code 42 is decrypted, as shown at step 108 and a determination is then made as to whether the decrypted authentication code 42 match the serial number 34 and date 32 for the lottery ticket being authenticated. If the decrypted code does not match at decision 110, then the process returns that the ticket is not authentic, as shown at step 112, and the authentication process ends. Otherwise, if the decrypted code matches at decision 110, then the process returns that the ticket is authentic, as shown at step 114, and the authentication process ends. It should be noted that instead of decryption at step 108, the server 12 could verify the authentication code as a digital signature.

In the above embodiment, the authentication code 42 is generated by asymmetrically encrypting a lottery ticket's clear text serial number and the ticket is then validated by confirming that the associated second (public) key decryption of the authentication code produces clear text that is equivalent to the lottery ticket's serial number. It should be noted that the correct result of the decryption process and the second (public) key could be known by an insider attacker of the server 12 side, making the system 10 susceptible to brute force attacks, i.e., where the attacker methodically generates pseudorandom "cipher" text, "decrypts" the pseudorandom "cipher" text, and tests to see if the resulting clear text equals the desired result.

To guard against this type of attack, the authentication code cipher text should be sufficiently long to ensure that a brute force attack (even with parallel computer processing) is impractical. Given that the complexity of a binary number (and consequently the difficulty of a brute force attack) doubles for every additional bit added, a reasonable authentication code bit length should be at least 100 bits. For strong encryption, the asymmetrical key pair should be greater than 400 bits because of the factoring challenge. And because the resulting cipher text from an asymmetrical encryption algorithm will be some variable length of bits less than the key length, the authentication code needs to be larger enough to handle the range of results, and accordingly, should be at least 400 bits long.

Because the pseudorandom nature of the key generation terminals 16, the public keys stored at the server 12 can be audited to ensure that the randomness is maintained and thus, that the security of the encryptions of the authentication codes is high. Since in the system 10 the server 12 is required to maintain a database of all terminal second (public) keys, the second key database can be audited with the assurance that the terminal 16 is truly selecting pseudorandom key pairs. For audit purposes, the public key database can be assumed to be random and therefore secure if it passes two general tests: (1) It appears random; and (2) it is unpredictable. It must be computationally infeasible to predict what the next public key will be given complete knowledge of the algorithm generating the keys.

To ensure randomness, there are automated tests that a third party (e.g., a Lottery authority) can perform to ensure that the second (public) key database is random. One test is to determine if the distribution of "1s" and "0s" throughout the second (public) key database is approximately even. Further, approximately half of the runs (sequences of the same bit) should be of length one, one quarter of length two, one eight of length three, and so on. Also, the distribution of run lengths for "1s" and "0s" should be about the same. Finally, when an off-the-shelf loss-less compression algorithm is applied to the database of second (public) keys the compression level should not exceed 25%. All of the above properties can then be quantified with their output applied to a "chi-squared" test, which is a mathematical test known in the art to measure deviation of a sample from expectation, to ensure the randomness of the second key database.

To ensure unpredictability, an auditor can be reasonably assured that the sequence of public keys is unpredictable by simply scanning multiple databases for repeated keys or sequences of keys. While some small number of key repetitions can be possible, a chi-squared test would reveal if a level of repetition were excessive.

While there has been shown a preferred and alternate embodiments of the present invention, it is to be appreciated that certain changes may be made in the form and arrangement of the elements, and steps of the methods without departing from the underlying spirit and scope of the invention as is set forth in the Claims. Furthermore, although elements of the invention may be described or claimed in the singular, the plural is contemplated unless limitation to the singular is explicitly stated.

What is claimed is:

1. A method for vending printed on-line lottery tickets from a plurality of terminals connected to a central server over a network, and for subsequent authentication of the lottery tickets presented for redemption, said method comprising:

for each of the terminals that prints a lottery ticket with a player's entry in a lottery game, generating an asymmetric key pair at the terminal that is unique to the respective terminal, the asymmetric key pair comprising a first private key that is stored at the respective terminal and a corresponding second public key;

encrypting the second public key using a permanent terminal private key to create a certificate, wherein the first private key is different from the permanent private key of the terminal;

communicating the certificate to and storing the certificate in the central server, the central server storing respective certificates for the plurality of terminals;

at a vending time of a lottery ticket at a terminal, communicating a request by the terminal to the central server for a unique serial number and other data piece to be printed in plain text on the lottery ticket by the terminal;

upon receiving the request for the unique serial number and other data piece, the central server verifying that a certificate has been generated and stored for the respective requesting terminal, and upon satisfying the verification, the central server assigning a plain text data piece and unique serial number to the lottery ticket to be printed at the requesting terminal;

upon receipt of the plain text data piece and unique serial number, the requesting terminal generating an authentication code by encrypting the unique serial number and plain text data piece using the first private key, and printing the authentication code, plain text unique serial number, and plain text data piece on the lottery ticket along with the player's entry in the lottery game without transmitting the authentication code back to the central server at the time of purchase and printing of the lottery ticket, and wherein the plain text data piece comprises a multi-digit date corresponding to the date of purchase of the lottery ticket;

upon subsequent verification of a lottery ticket presented for redemption, transmitting the authentication code and plain text unique serial number and data piece printed on the presented lottery ticket to the central server, the central server then retrieving the certificate corresponding to the unique first private key used to create the authentication code on the lottery ticket at time of printing the lottery ticket, deciphering the second public key from the certificate using a permanent terminal public key, and deciphering the authentication code using the second public key; and the central server verifying the lottery ticket as authentic if the authentication code is validly deciphered using the second public key such that the deciphered authentication code matches the plain text serial number and data piece printed on the lottery ticket.

2. The method as in claim 1, wherein the certificate is communicated to the central server with the request for the unique serial number and other data piece.

3. The method as in claim 1, further comprising randomly changing the asymmetric key pairs generated by the terminals, the central server maintaining a library of second public keys for each respective terminal so that the correct second public key is available for deciphering the authentication code even after the asymmetric key pairs have been changed at the terminal.

4. A system configured for vending on-line printed lottery tickets that include a player's entry in a lottery game, and for authentication of lottery tickets subsequently presented for redemption, said system comprising:

a plurality of remote lottery terminals in communication with a central server over a network, the lottery terminals including printing devices for printing the lottery tickets;

each of the terminals configured to generate an asymmetric key pair that is unique to the respective terminal, the asymmetric key pair comprising a first private key that is stored at the respective terminal and a corresponding second public key that is communicated by the terminal to the central server;

each of the terminals further configured to generate a permanent terminal private key and a permanent terminal public key and to encrypt the second public key using the permanent terminal private key to create a certificate that is communicated by the terminal to the central server, wherein the permanent terminal private key and the permanent terminal public key are different from the first private key and the second private key;

the central server including a memory in which the respective certificates for the plurality of terminals are stored;

the central server configured to generate a unique plain text serial number and date to each lottery ticket printed at one of the terminals upon request of the terminals and verification that a certificate is stored at the central server for the lottery terminal making the request;

each of the terminals further configured to generate an authentication code for each lottery ticket printed at the terminal by using the first private key to encrypt the unique plain text serial number and date received from the central server, and to print the authentication code and plain text serial number and date on the lottery ticket along with the player's entry in the lottery game, wherein the authentication code is not transmitted to the central server and is contained only on the printed lottery ticket, at the time of purchase;

for subsequent authentication of a lottery ticket presented for redemption, the central server configured to retrieve the certificate from memory corresponding to the unique first private key used to create the authentication code on the lottery ticket, decipher the second public key from the certificate using the permanent terminal public key, and decipher the authentication code using the second public key; and the central server configured to indicate that the lottery ticket presented for redemption is authentic if the authentication code is validly deciphered using the second public key such that the deciphered authentication code matches the unique plain text serial number and date printed on the lottery ticket.

5. The system as in claim 4, wherein the terminals transmit the certificate to the central server with the request for the serial number and date at the time of vending of a lottery ticket.

6. The system as in claim 4, wherein the terminals are configured to randomly change the asymmetric key pair, the central server including a library of second public keys for each respective terminal so that the correct second public key is available for deciphering the authentication code even after the asymmetric key pair has been changed at the terminal.

* * * * *